(12) United States Patent
Summers

(10) Patent No.: US 11,226,254 B2
(45) Date of Patent: Jan. 18, 2022

(54) PRESSURE SWITCH ASSEMBLY HAVING QUICK CONNECT CAPILLARY TUBE

(71) Applicant: John Summers, Sandy Springs, GA (US)

(72) Inventor: John Summers, Sandy Springs, GA (US)

( * ) Notice: Subject to any disclaimer, the term of this patent is extended or adjusted under 35 U.S.C. 154(b) by 70 days.

(21) Appl. No.: 16/868,761

(22) Filed: May 7, 2020

(65) Prior Publication Data

US 2021/0348979 A1 Nov. 11, 2021

(51) Int. Cl.
*G01L 19/00* (2006.01)
*F25B 49/02* (2006.01)
*G01L 19/06* (2006.01)

(52) U.S. Cl.
CPC ........ *G01L 19/0015* (2013.01); *G01L 19/003* (2013.01); *G01L 19/0672* (2013.01); *F25B 49/02* (2013.01); *F25B 2700/19* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106; F25B 49/022; F25B 2700/1931; F25B 49/005; F25B 2500/07; F25B 2600/027; F25B 49/02; F25B 49/025; F25B 45/00; F25B 9/145; F25B 13/00; F25B 2309/1424; F25B 2345/002; F25B 9/008; F25B 2309/1418; F25B 2700/1933; F25B 2309/006; F25B 2309/1408; F25B 2309/14181; F25B 2339/047; F25B 2345/006; F25B 2400/22; F25B 2500/222; F25B 2700/21152; F25B 30/02;
(Continued)

(56) References Cited

U.S. PATENT DOCUMENTS

| | | | | |
|---|---|---|---|---|
| 3,243,969 | A | * 4/1966 | Dirk | F25B 45/00 62/77 |
| 4,103,124 | A | * 7/1978 | Reis | H01H 35/24 200/51 R |
| 2010/0205953 | A1* | 8/2010 | Bettin | A01C 7/081 60/455 |

FOREIGN PATENT DOCUMENTS

| | | | | |
|---|---|---|---|---|
| CA | 2675799 A1 | * 6/2010 | ............ | A01C 5/062 |
| FR | 2884428 A1 | * 10/2006 | ......... | A62C 99/0081 |

* cited by examiner

*Primary Examiner* — Andre J Allen
(74) *Attorney, Agent, or Firm* — Thomas | Horstemeyer, LLP

(57) ABSTRACT

Embodiments of a pressure switch assembly having a quick connect capillary tube are disclosed. One embodiment, among others, has an elongated cylindrical capillary tube for attachment to a refrigeration line so that refrigeration fluid pressure in the refrigeration line can be sensed. A quick connect coupling is connected to the shutoff valve. A shutoff valve is designed to open and close fluid communication between the capillary tube and the quick connect coupling when the quick connect coupling is coupled and decoupled, respectively. A switch body is connected to the quick connect coupling and has first and second electrical connections. The switch body has an internal on/off switch designed to electrically connect and electrically disconnect the first and second electrical connections based upon a predetermined set point of pressure associated with refrigeration fluid that is in communication with the switch body.

20 Claims, 4 Drawing Sheets

(58) Field of Classification Search
CPC .. F25B 41/20; F25B 49/00; F25B 2309/1411; F25B 2313/0313; F25B 2345/001; F25B 2400/16; F25B 2600/024; F25B 2700/193; F25B 2700/2117; F25B 31/02; F25B 43/006; F25B 9/14; F25B 1/00; F25B 2309/002; F25B 2309/061; F25B 2309/1425; F25B 2313/0293; F25B 2400/0751; F25B 2400/12; F25B 2500/01; F25B 2600/0253; F25B 2600/23; F25B 27/00; F25B 2700/2106; F25B 29/003; F25B 39/04; F25B 49/027; F25B 1/04; F25B 1/053; F25B 1/10; F25B 2309/1407; F25B 2309/1412; F25B 2309/1414; F25B 2309/1415; F25B 2309/1421; F25B 2309/14241; F25B 2313/004; F25B 2313/005; F25B 2313/021; F25B 2313/02741; F25B 2339/044; F25B 2339/0441; F25B 2345/007; F25B 2400/0401; F25B 2400/0417; F25B 2400/05; F25B 2400/075; F25B 2400/13; F25B 25/005; F25B 2500/12; F25B 2500/22; F25B 2500/27; F25B 2600/02; F25B 2600/021; F25B 2600/0261; F25B 2600/11; F25B 2600/111; F25B 2600/17; F25B 2600/19; F25B 2600/21; F25B 2600/2513; F25B 2600/2515; F25B 27/002; F25B 2700/11; F25B 2700/15; F25B 2700/19; F25B 2700/195; F25B 2700/2116; F25B 30/06; F25B 31/002; F25B 31/026; F25B 40/02; F25B 40/04; F25B 41/00; F25B 43/00; F25B 43/043; F25B 47/02; F25B 47/022; F25B 47/025; F25B 9/06; F25B 9/1037
USPC .................................................. 73/700–756
See application file for complete search history.

PRESSURE SWITCH ASSEMBLY HAVING QUICK CONNECT CAPILLARY TUBE

FIELD OF THE INVENTION

The present invention generally relates to refrigeration systems for air conditioners, ice makers, etc., and more particularly to pressure switches that are actuated based upon pressure sensed in refrigeration lines of refrigeration systems in order to control, for example, fans and compressors.

BACKGROUND OF THE INVENTION

Refrigeration systems for air conditioners, ice makers, etc., typically have two to five on/off pressure switches that sense pressure in refrigeration lines to control fans, compressors, etc. Generally, sensing pressure of the refrigeration fluid is an indirect way to sense the temperature of the fluid, because they are directly related. So, as an example, when the temperature of the fluid is too high (i.e., the pressure is higher than a predetermined set point), a fan is turned on to cool down the refrigeration fluid.

As shown in FIG. 1, each pressure switch assembly 11 has an elongated copper capillary tube 13. One end of the capillary tube is soldered 15 to a copper refrigeration line 17 and samples refrigeration fluid passing through the refrigeration line 17. The other end of the capillary tube 13 is connected to a switch body 19. The switch body 19 has two connections 21a, 21b (wires, leads, etc.) that are exposed and/or extend outwardly. These connections are electrically connected to a controller for controlling a fan, compressor, etc. When pressure in the refrigeration line 17 surpasses a predetermined set point, an internal switch in the switch body 19 causes the connections 21a, 21b to transition, depending upon the design, from an open circuit to a closed circuit, or alternatively, from a closed circuit to an open circuit, thereby causing the controller to take some action.

In some conventional models (e.g., Welbilt), replacement of a bad pressure switch assembly 11 requires unsoldering of the capillary tube 13 from the refrigeration line 17 and re-soldering a new capillary tube 13 of a new pressure switch assembly 11 to the refrigeration line 17. This undesirably requires much labor and the refrigeration line 17 must be emptied of refrigeration fluid in order to make the replacement. All of the foregoing resulting in high costs for the repair.

In another conventional design for a pressure switch assembly 31, as shown in FIG. 2, the capillary tube 33 has a threaded male plug 34 that is detachably threaded into a corresponding female socket 32 of the switch body 39, so that the capillary tube 33 does not need to be re-soldered to the refrigeration line 37 when the switch body 39 is replaced. However, although this replacement process eliminates the need for soldering and emptying the refrigeration fluid from the line as well as savings in terms of labor costs, this replacement process still does lead to some undesirable leakage of a significant amount of refrigeration fluid, which is hazardous to the environment.

SUMMARY OF THE INVENTION

Embodiments of a pressure switch assembly having a quick connect capillary tube are disclosed.

One embodiment, among others, has a capillary tube. The capillary tube can be attached to a refrigeration line so that refrigeration fluid in the refrigeration line is in fluid communication with the capillary tube. A switch body is in fluid communication with the capillary tube. The switch body has a switch designed to electrically connect and disconnect a plurality of electrical connections based upon a preset pressure associated with refrigeration fluid that is in fluid communication with the switch body. A quick connect coupling is designed to couple and decouple the capillary tube and the switch body in order to open and close, respectively, fluid communication between the capillary tube and the switch body, respectively. A shutoff valve is designed to open and close fluid communication between the capillary tube and the quick connect coupling when the quick connect coupling is coupled and decoupled, respectively.

Another embodiment, among others, has an elongated cylindrical capillary tube. The capillary tube can be attached to a refrigeration line so that refrigeration fluid in the refrigeration line is in fluid communication with the capillary tube. An automatic shutoff valve is connected to and in fluid communication with the capillary tube. The shutoff valve is designed to open and close fluid communication through the shutoff valve. A quick connect coupling is connected to and in fluid communication with the shutoff valve. The quick connect coupling enables connection and disconnection of a male half and a female half in order to open and close, respectively, fluid communication through the quick connect coupling. The automatic shutoff valve is designed to open and close fluid communication between the capillary tube and the quick connect coupling when the male half is connected and disconnected to the female half, respectively. A switch body is connected to and in fluid communication with one of the male half and the female half of the quick connect coupling. The switch body has first and second electrical connections extending from the switch body. The switch body has an internal on/off switch designed to electrically connect and electrically disconnect the first and second electrical connections based upon a predetermined set point of pressure associated with refrigeration fluid that is in communication with the switch body.

Still another embodiment, among others, is a method for replacing the switch body of the pressure switch assembly described in the previous paragraph that is installed on a refrigeration line of a refrigeration system. The method comprises the steps of (a) uninstalling the switch body from fluid communication with a combination of the shutoff valve, the capillary tube and the refrigeration line by disconnecting the male half and the female half of the quick connect coupling; and (b) installing a new switch body in fluid communication with the combination by connecting the male half and the female half of the quick connect coupling.

Yet another embodiment, among others, has an elongated cylindrical capillary tube. The capillary tube can be attached to a refrigeration line so that refrigeration fluid in the refrigeration line is in fluid communication with the capillary tube. A switch body is connected to and is in fluid communication with the capillary tube. The switch body has a switch designed to electrically connect and electrically disconnect first and second electrical connections based upon a predetermined set point of pressure associated with refrigeration fluid that is in fluid communication with the switch body. This embodiment further includes a means for coupling the tube and the switch body and, after the coupling, permitting fluid communication between the switch body and the tube as well as a means for decoupling the tube and the switch body and, after the decoupling, preventing fluid communication between the switch body and the tube.

Other embodiments, apparatus, methods, features, and advantages of the present invention will be apparent to one with skill in the art upon examination of the following drawings and detailed description. It is intended that all such additional embodiments, apparatus, methods, features, and advantages be included within this disclosure, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENT

Figure 1:
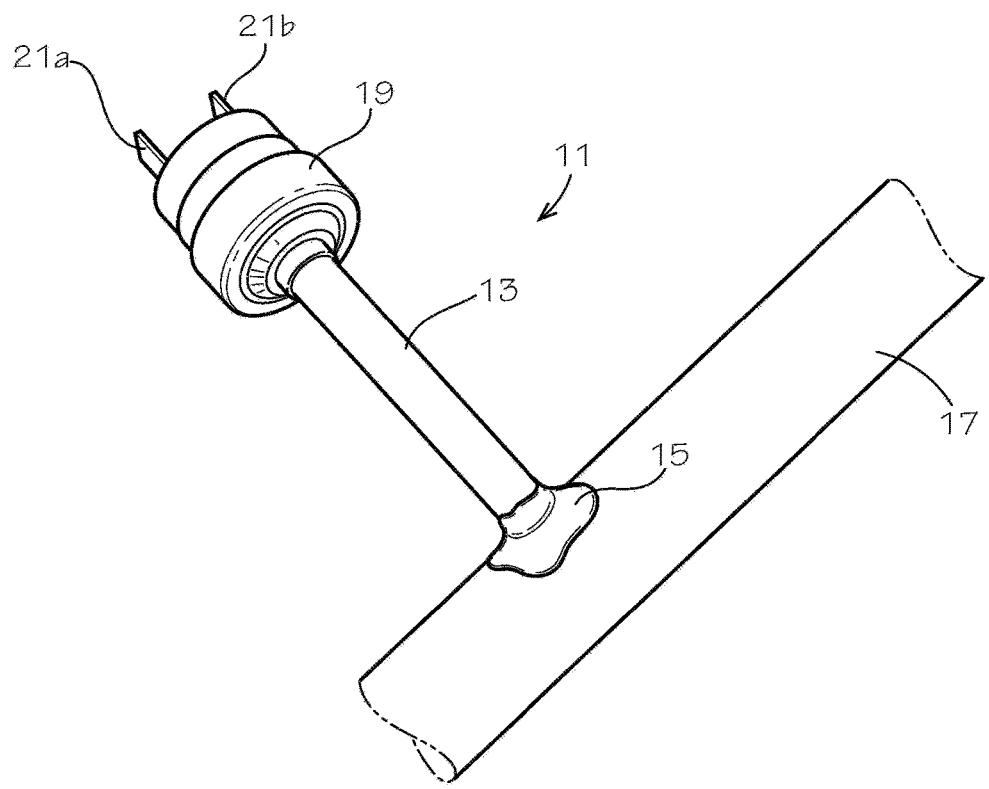
FIG. 1 is a perspective view of a first prior art embodiment of a pressure switch assembly that senses pressure in refrigeration lines to control, for example, fans and compressors.
Figure 2:
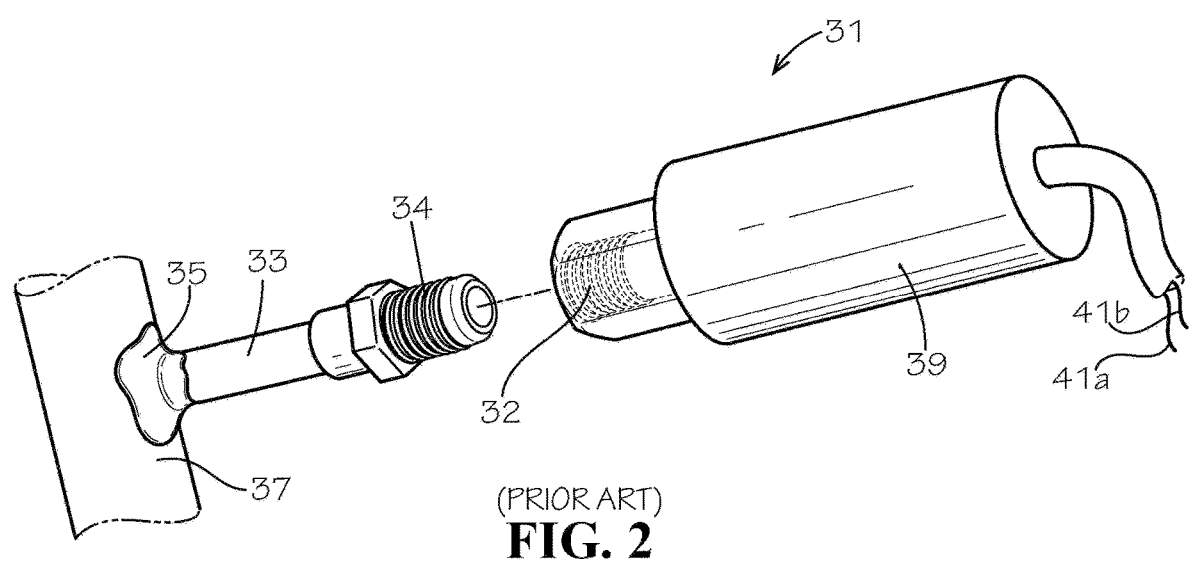
FIG. 2 is a perspective view of a second prior art embodiment of a pressure switch assembly that senses pressure in refrigeration lines to control, for example, fans and compressors.
Figure 3:
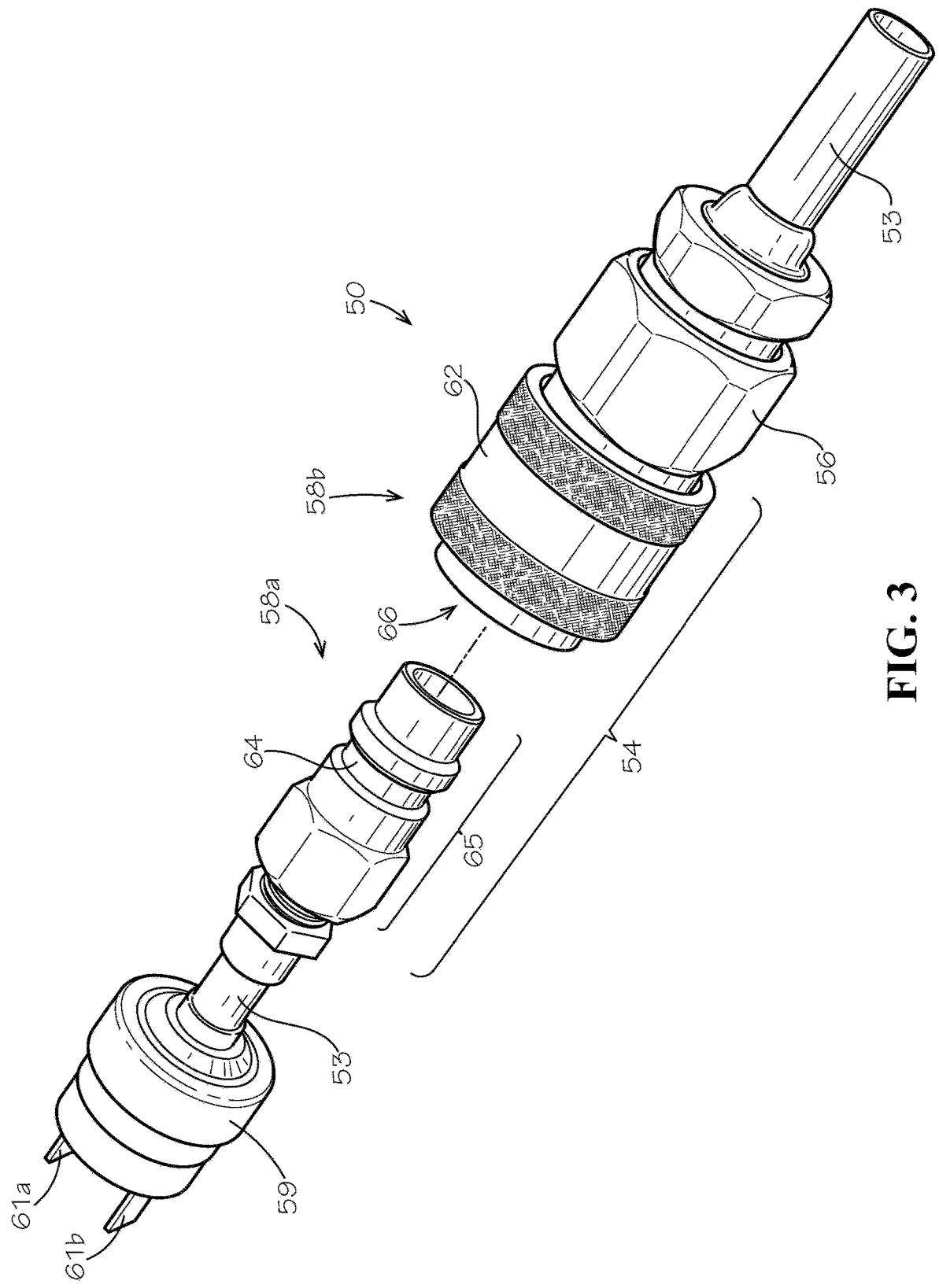
FIG. 3 is an exploded view of an example embodiment of a pressure switch assembly with a quick connect capillary tube in accordance with the present invention, showing a male half that is insertable into a female half.
Figure 4:
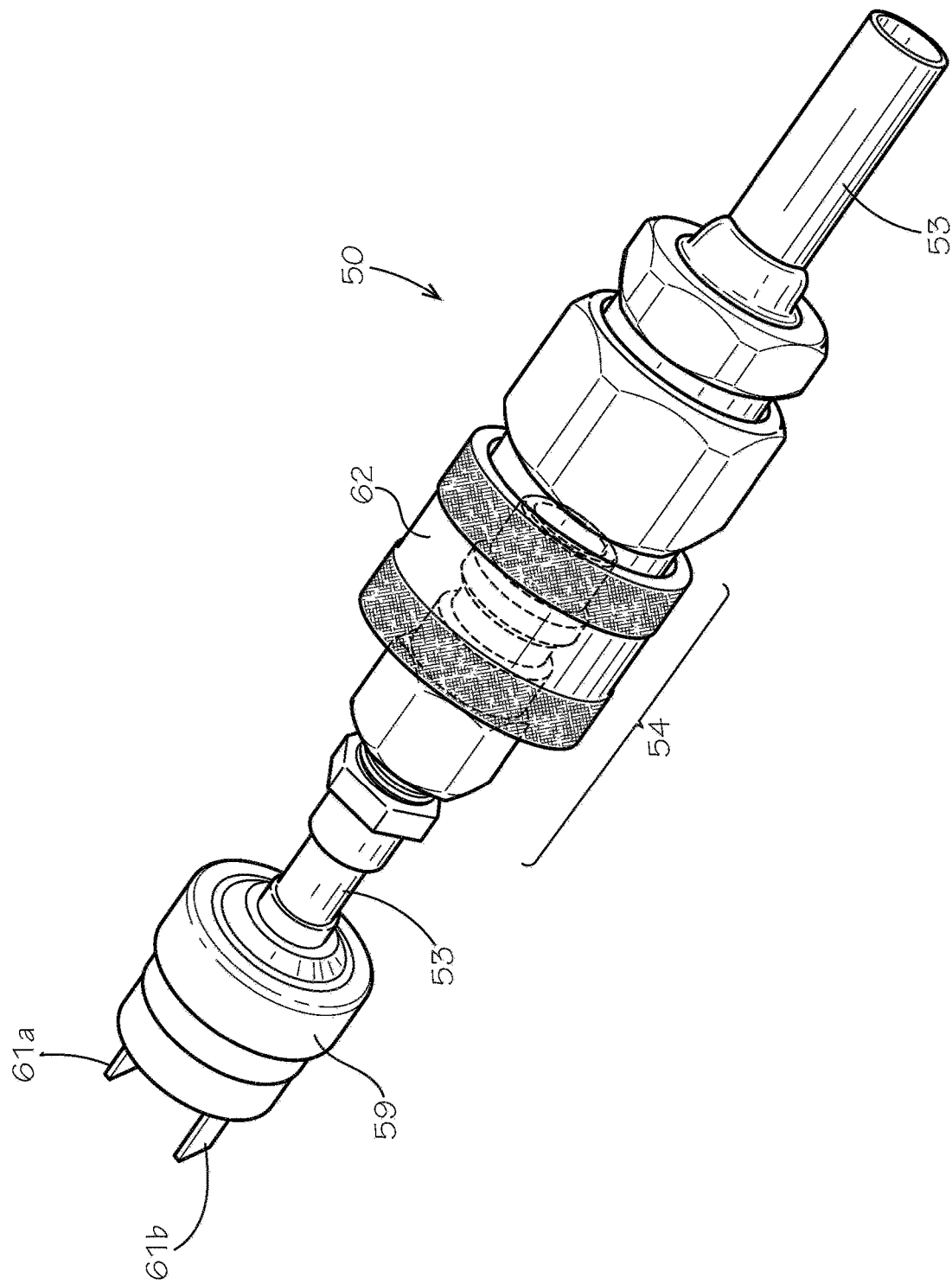
FIG. 4 is a perspective view of the pressure switch assembly of FIG. 3 in assembled format, showing the male half inserted into and matingly engaged with the female half.
Figure 5:
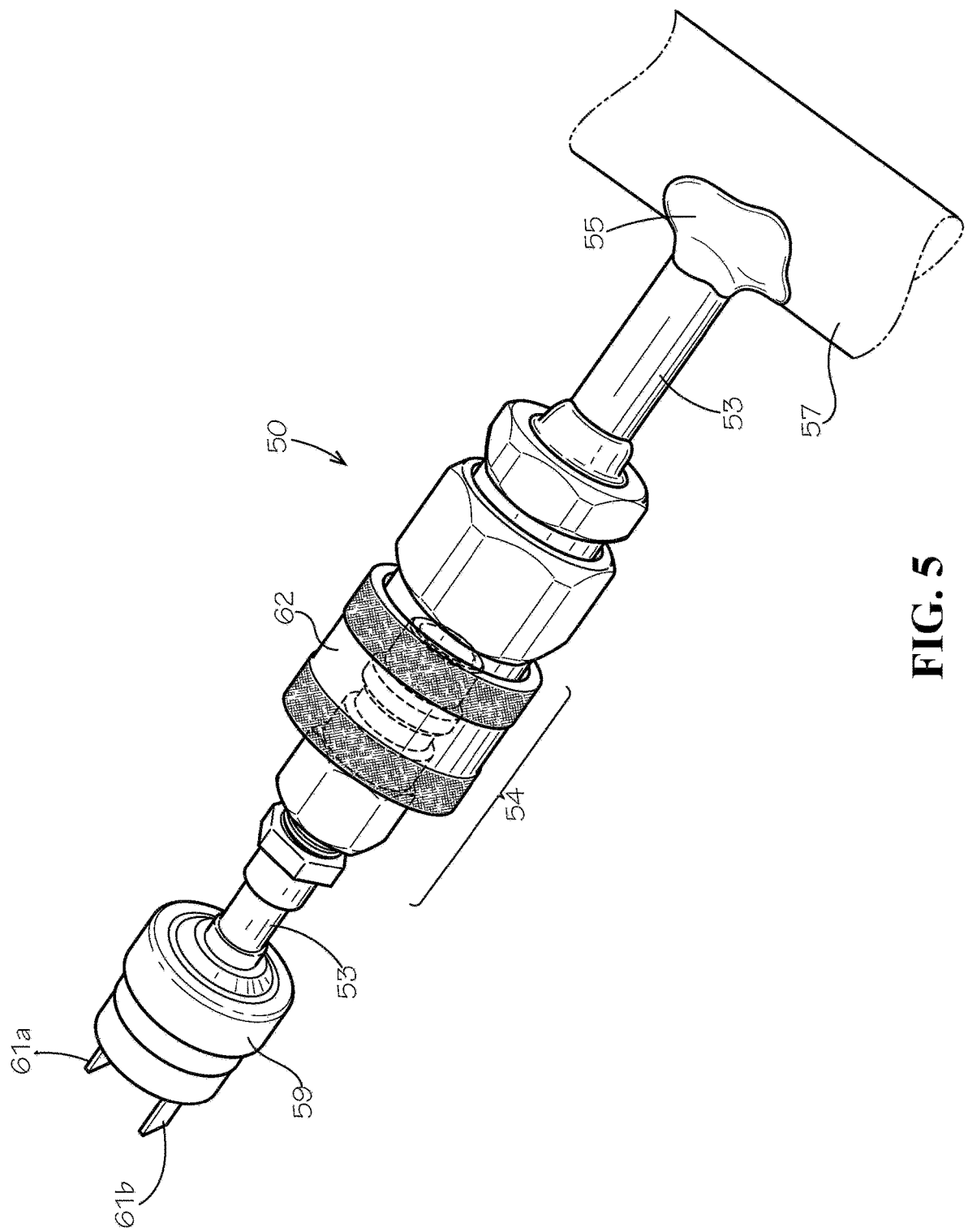
FIG. 5 is a perspective view of the pressure switch assembly of FIGS. 3 and 4 soldered to a refrigeration line.

Embodiments of a pressure switch assembly having a quick connect capillary tube are disclosed. FIGS. 3, 4, and 5 show a preferred embodiment of a pressure switch assembly 50 with a quick connect capillary tube in accordance with the present invention. The pressure switch assembly 50 has a quick connect coupling 54, or fitting, situated along the capillary tube 53. This arrangement enables the pressure switch body 59 to be quickly separated from the refrigeration line 57 without any significant leakage of the refrigeration fluid from the refrigeration line 57, and also quick reinstallation of a new switch body 59 without any significant leakage of the refrigeration fluid from the line 57.

The quick connect coupling 54 of this preferred embodiment is a ball-lock type coupling, which can be operated by hand without a wrench. The quick connect coupling 54 has a male half 58a and a female half 58b. The generally cylindrical plug 65 of the male half 58a is inserted into a generally cylindrical socket 66 of the female half 58b when connecting the two halves, and the plug 65 of the male half 58a is separated from the socket 66 of the female half 58b when disconnecting the two halves. In structure, a group of balls is positioned in respective holes that are circumferentially located and spaced around the internal diameter (ID) of the socket 66 of the female half 58b. These holes normally are tapered or stepped to reduce their diameter at the socket body ID, so the balls do not fall in a radial direction into the socket cavity vacated by the plug 65 of the male half 58a when the quick connect coupling 54 is disconnected.

Also in the female half 58b, a cylindrical spring-loaded sleeve 62 around the socket body's outside diameter (OD) forces the balls toward the socket body ID. To connect the plug of the male half 58a, the sleeve 62 is pushed back, which provides clearance so the balls are free to move outward in a radial direction. Once the plug 65 is in place, releasing the sleeve 62 forces the balls inward in a radial direction into and against a circumferential locking groove 64 on the OD of the plug 65. To disconnect, pushing the sleeve 62 back provides the balls with clearance to move outward and allow the plug 65 of the male half 58a to be removed from the socket 66 of the female half 58b.

The quick connect coupling 54 is equipped with at least one self-sealing automatic shutoff valve 56 situated in the female half 58b of the quick connect coupling 54. When the quick connect coupling is disconnected, i.e., when the plug of the male half 58a is removed from the socket of the female half 58b, a mechanical link between the coupling halves 58a, 58b, is broken, and the shutoff valve 56 automatically closes and contains any refrigeration fluid in the part of the capillary tube 53 soldered to and situated nearest to the refrigeration line 57 as well as in the refrigeration line 57 itself.

The switch body 59, which is attached to a part of the capillary tube 53 nearest the male half 58a of the coupling 54, has electrical connections 61a, 61b. The electrical connections 61a, 61b can be electrically connected via appropriate wiring to a controller, which can control, for example, fans, compressors, etc. The switch body 59 includes and houses a deformable or movable part, such as a diaphragm, piston with spring combination, etc., that the refrigeration fluid mechanically moves, directly or indirectly, based upon fluid pressure. As the pressure of the refrigeration fluid changes, the movable part is physically moved, and if the movement is beyond a preset pressure, or predetermined pressure set point, then an internal on/off switch that is in electrical communication with the electrical connections 61a, 61b is actuated and causes the electrical connections 61a, 61b to be connected or disconnected, so that there is a closed circuit or open circuit, respectively, between the connections 61a, 61b. This condition is in turn sensed by the controller, which then will take some action. In some embodiments, the predetermined set point can be adjusted with a suitable adjustment mechanism, for example, an adjustment screw.

Modification, Variations, and Alternative Embodiments

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

As examples, in possible alternative embodiments of the pressure switch assembly 50, the pressure switch assembly 50 includes a different type of quick connect coupling in connection with the capillary tube 53. The pressure switch assembly 50 can employ any of the following known types of quick connect couplings, as non-limiting examples: (a) a pin-lock coupling, which uses pins arranged in a truncatedcone formation to grip and hold a plug in a socket; (b) a flat-faced coupling, which can virtually eliminate leakage by limiting the leakage to a drop of flued or less upon disconnection; (c) a bayonet coupling, which requires insertion of a plug into a socket, and then a sleeve is twisted to secure them together; (d) a ring lock coupling, which uses a split ring seated in a groove and slot in the socket to secure a plug to a socket; and (e) a cam lock coupling, which uses one or more external levers that are folded back against the side(s) of the socket in order to secure a plug in the socket. All of the foregoing types of quick connect couplings are described in further detail in an article titled "Fundamentals of Quick Connect Couplings," which can be found at the following website: https://www.hydraulicspneumatics.com/technologies/fittings-couplings/article/21884203/fundamentals-of-quickacting-couplings The foregoing article is incorporated herein by reference in its entirety.

In possible alternative embodiments of the pressure switch assembly 50, the pressure switch assembly 50 can include a shutoff valve in both the male half 58a and the female half 58b of the quick connect coupling 54. Placement of a shutoff valve in the male half 58a of the quick connect coupling 54 near the switch body 59 may be desirable to prevent leakage of fluid from this disconnected part when it is replaced.

In possible alternative embodiments of the pressure switch assembly 50, the pressure switch assembly 50 may employ a quick connect coupling 54 having a female half 58b that is situated near the switch body 59 and a male half 58a that is situated near the refrigeration line 57. In such an embodiment, a shutoff valve would be placed in the male half, and optionally another shutoff valve in the female half.

In possible alternative embodiments of the pressure switch assembly 50, the pressure switch assembly 50 may employ a quick connect coupling 54 having a male half 58a that is attached directly to the switch body 59 (i.e., without any capillary part between the male half 58a and the switch body 59).

In possible alternative embodiments of the pressure switch assembly 50, the pressure switch assembly 50 may employ a quick connect coupling 54 having a shutoff valve 56 that is an integral part of the coupling 54, i.e., is not a separate or physically separable discrete component from the coupling 54. Examples of such a design are described in the following patents, which are incorporated herein by reference: U.S. Pat. Nos. 4,458,719; 3,807,687; and 2,825,583.

The invention claimed is:

1. A pressure switch assembly that actuates based upon pressure sensed in a refrigeration line, the pressure switch comprising:
   an elongated cylindrical capillary tube, the capillary tube for attachment to a refrigeration line so that refrigeration fluid in the refrigeration line is in fluid communication with the capillary tube;
   an automatic shutoff valve connected to and in fluid communication with the capillary tube, the shutoff valve designed to open and close fluid communication through the shutoff valve;
   a quick connect coupling connected to and in fluid communication with the shutoff valve, the quick connect coupling enabling connection and disconnection of a male half and a female half in order to open and close, respectively, fluid communication through the quick connect coupling;
   wherein the automatic shutoff valve is designed to open and close fluid communication between the capillary tube and the quick connect coupling when the male half is connected and disconnected to the female half, respectively;
   a switch body connected to and in fluid communication with one of the male half and the female half of the quick connect coupling, the switch body having first and second electrical connections extending from the switch body, the switch body having a switch designed to electrically connect and electrically disconnect the first and second electrical connections based upon a predetermined set point of pressure associated with refrigeration fluid that is in communication with the switch body.

2. The pressure switch assembly of claim 1, further comprising the refrigeration line and wherein the capillary tube is attached to and in fluid communication with the refrigeration line.

3. The pressure switch assembly of claim 2, wherein the capillary tube is attached to the refrigeration line via solder.

4. The pressure switch assembly of claim 1, wherein the female half is connected to the switch body.

5. The pressure switch assembly of claim 1, wherein the male half is connected to the switch body.

6. The pressure switch assembly of claim 1, further comprising a second shutoff valve that connects and enables fluid communication between the quick connect coupling and the switch body, the second shutoff valve designed to open and close fluid communication through the second shutoff valve when the quick connect coupling is coupled and decoupled, respectively.

7. The pressure switch assembly of claim 1, further comprising a second elongated cylindrical capillary tube that connects and enables fluid communication between the one half of the quick connect coupling and the switch body.

8. The pressure switch assembly of claim 1, wherein the quick connect coupling is a ball lock type coupling.

9. The pressure switch assembly of claim 8, wherein:
   the male half of the quick connect coupling has a cylindrical plug with an outer circumferential groove; and
   the female half of the quick connect coupling has a cylindrical socket that receives the plug, a plurality of balls that move radially in and out of the groove in order to connect and disconnect the male half and the female half, respectively, and a cylindrical outer sleeve that is longitudinally movable to move the balls radially in and out of the groove.

10. A method for replacing the switch body of the pressure switch assembly of claim 1 installed on a refrigeration line of a refrigeration system, the method comprising the steps of:
    providing the pressure switch assembly installed on the refrigeration line of the refrigeration system;
    uninstalling the switch body from fluid communication with a combination of the shutoff valve, the capillary tube and the refrigeration line by disconnecting the male half and the female half of the quick connect coupling; and
    installing a new switch body in fluid communication with the combination by connecting the male half and the female half of the quick connect coupling.

11. A pressure switch assembly that actuates based upon pressure sensed in a refrigeration line, the pressure switch comprising:
    an elongated cylindrical capillary tube, the capillary tube for attachment to a refrigeration line so that refrigeration fluid in the refrigeration line is in fluid communication with the capillary tube;

a switch body connected to and in fluid communication with the capillary tube, the switch body having a switch designed to electrically connect and electrically disconnect first and second electrical connections based upon a predetermined set point of pressure associated with refrigeration fluid that is in fluid communication with the switch body;

means for coupling the tube and the switch body and, after the coupling, permitting fluid communication between the switch body and the tube; and means for decoupling the tube and the switch body and, after the decoupling, preventing fluid communication between the switch body and the tube.

12. A pressure switch assembly that actuates based upon pressure sensed in a refrigeration line, the pressure switch comprising:

a capillary tube, the capillary tube for attachment to a refrigeration line so that refrigeration fluid in the refrigeration line is in fluid communication with the capillary tube;

a switch body in fluid communication with the capillary tube, the switch body having a switch designed to electrically connect and disconnect a plurality of electrical connections based upon a preset pressure associated with refrigeration fluid that is in fluid communication with the switch body;

a quick connect coupling designed to couple and decouple the capillary tube and the switch body in order to open and close, respectively, fluid communication between the capillary tube and the switch body, respectively; and a shutoff valve designed to open and close fluid communication between the capillary tube and the quick connect coupling when the quick connect coupling is coupled and decoupled, respectively.

13. The pressure switch assembly of claim 12, further comprising the refrigeration line and wherein the capillary tube is attached via solder to and in fluid communication with the refrigeration line.

14. The pressure switch assembly of claim 13, wherein the shutoff valve is an integral part of the quick connect coupling and is not a discrete component that is physically separable from the coupling.

15. The pressure switch assembly of claim 12, wherein the quick connect coupling comprises a male half and a female half, wherein the quick connect coupling enables connection and disconnection of the male half and the female half in order to open and close, respectively, fluid communication through the quick connect coupling, and wherein the female half is connected to the switch body.

16. The pressure switch assembly of claim 12, wherein the quick connect coupling comprises a male half and a female half, wherein the quick connect coupling enables connection and disconnection of the male half and the female half in order to open and close, respectively, fluid communication through the quick connect coupling, and wherein the male half is connected to the switch body.

17. The pressure switch assembly of claim 16, further comprising a second elongated cylindrical capillary tube that enables fluid communication between the male half of the quick connect coupling and the switch body.

18. The pressure switch assembly of claim 12, further comprising a second shutoff valve that enables fluid communication between the quick connect coupling and the switch body, the second shutoff valve designed to open and close fluid communication through the second shutoff valve when the quick connect coupling is coupled and decoupled, respectively.

19. The pressure switch assembly of claim 12, wherein the quick connect coupling is a ball lock type coupling with a male half and a female half, the male half and the female half capable of being coupled and decoupled.

20. The pressure switch assembly of claim 19, wherein:

the male half of the quick connect coupling has a cylindrical plug with an outer circumferential groove; and the female half of the quick connect coupling has a cylindrical socket that receives the plug, a plurality of balls that move radially in and out of the groove in order to connect and disconnect the male half and the female half, respectively, and a cylindrical outer sleeve that is longitudinally movable to move the balls radially in and out of the groove.

* * * * *